US009916250B2

(12) United States Patent
Shah et al.

(10) Patent No.: US 9,916,250 B2
(45) Date of Patent: *Mar. 13, 2018

(54) METHOD FOR USING SERVICE LEVEL OBJECTIVES TO DYNAMICALLY ALLOCATE CACHE RESOURCES AMONG COMPETING WORKLOADS

(71) Applicant: NetApp, Inc., Sunnyvale, CA (US)

(72) Inventors: Peter Shah, Waltham, MA (US); Keith Smith, Cambridge, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,635

(22) Filed: Feb. 21, 2017

(65) Prior Publication Data

US 2017/0161199 A1 Jun. 8, 2017

Related U.S. Application Data

(63) Continuation of application No. 14/522,259, filed on Oct. 23, 2014.

(51) Int. Cl.
*G06F 12/08* (2016.01)
*G06F 12/0871* (2016.01)
*G06F 12/0895* (2016.01)

(52) U.S. Cl.
CPC ...... *G06F 12/0871* (2013.01); *G06F 12/0895* (2013.01); *G06F 2212/1021* (2013.01);
(Continued)

(58) Field of Classification Search
CPC ............. G06F 12/0871; G06F 12/0895; G06F 2212/601; G06F 2212/282; G06F 2212/1021; G06F 12/02
(Continued)

(56) References Cited

U.S. PATENT DOCUMENTS 8,489,816 B1 7/2013 Reiner et al.
8,769,202 B1 7/2014 Soundararajan et al.
(Continued)

FOREIGN PATENT DOCUMENTS

WO 2013048573 A1 4/2013

OTHER PUBLICATIONS

Bairavasundaram et al., "Italian for Beginners: The Next Steps for SLO-Based Management", Proceeding, HotStorage '11 Proceedings of the 3rd USENIX Conference on Hot Topics in Storage and File Systems, Portland, OR, 2011, pp. 1-5.
(Continued)

*Primary Examiner* — Pierre Miche Bataille
(74) *Attorney, Agent, or Firm* — LeClairRyan, a Professional Corporation

(57) ABSTRACT

A method, device, and non-transitory computer readable medium that dynamically allocates cache resources includes monitoring a hit or miss rate of a service level objective for each of a plurality of prior workloads and a performance of each of a plurality of cache storage resources. At least one configuration for the cache storage resources for one or more current workloads is determined based at least on a service level objective for each of the current workloads, the monitored hit or miss rate for each of the plurality of prior workloads and the monitored performance of each of the plurality of cache storage resources. The cache storage resources are dynamically partitioned among each of the current workloads based on the determined configuration.

18 Claims, 8 Drawing Sheets

(52) U.S. Cl.
CPC .. *G06F 2212/222* (2013.01); *G06F 2212/282* (2013.01); *G06F 2212/601* (2013.01)

(58) Field of Classification Search
USPC .................................................. 711/119, 170
See application file for complete search history.

(56) References Cited

U.S. PATENT DOCUMENTS

| | | | |
|---|---|---|---|
| 8,874,848 | B2 | 10/2014 | Soundararajan et al. |
| 2002/0046322 | A1* | 4/2002 | Butterworth ........ G06F 11/2089 711/114 |
| 2007/0083712 | A1 | 4/2007 | Bradford et al. |
| 2012/0239739 | A1* | 9/2012 | Manglik ............... G06F 9/5077 709/203 |
| 2013/0151778 | A1 | 6/2013 | Daly et al. |
| 2013/0166724 | A1 | 6/2013 | Bairavasundaram et al. |
| 2013/0282994 | A1 | 10/2013 | Wires et al. |
| 2014/0089629 | A1* | 3/2014 | Griffin ................ G06F 12/1009 711/173 |
| 2014/0095691 | A1 | 4/2014 | Ganguli et al. |
| 2014/0317315 | A1* | 10/2014 | Duchesneau ......... G06F 9/5072 709/250 |
| 2015/0046653 | A1 | 2/2015 | Soundararajan et al. |
| 2015/0106578 | A1 | 4/2015 | Warfield et al. |

OTHER PUBLICATIONS

Goyal P., et al., "CacheCow: QoS for Storage System Cache," Eleventh International Workshop on Quality of Service (IWQoS 03), 2003, 18 pages.

Guerra J., et al., "Cost Effective Storage Using Extent Based Dynamic Tiering," Proceedings of 9th USENIX Conference on File and Storage Technologies (FAST '11 ), Feb. 2011, 14 pages.

Leung, et al., "Measurement and Analysis of Large-Scale Network File System Workloads", USENIX '08: USENIX Annual Technical Conference, 2008, pp. 213-226.

Lu et al.,, "Lu et al., "An Adaptive Control Framework for QoS Quarantees and its Application to Differentiated Caching Services", University of Virginia, Charlottesville, VA 22903,2002, pp. 1-20.", 2002, 1-20.

Narayanan, et al., "Migrating Server Storage to SSDs: Analysis of Tradeoffs", Microsoft Research Cambridge, UK, 2009, pp. 145-158.

Wachs, et al., "Argon: Performance Insulation for Shared Storage Servers", FAST '07: 5th USENIX Conference on file and Storage Technologies, 2007, pp. 61-76.

* cited by examiner

METHOD FOR USING SERVICE LEVEL OBJECTIVES TO DYNAMICALLY ALLOCATE CACHE RESOURCES AMONG COMPETING WORKLOADS

This application is a continuation of U.S. patent application Ser. No. 14/522,259, filed Oct. 23, 2014, which is hereby incorporated by reference in its entirety.

FIELD

This technology generally relates to methods and devices for allocating cache and, more particularly, to methods and devices for using service level objectives to dynamically allocate cache resources.

BACKGROUND

There are many shortcomings with existing approaches for managing caching technologies, policies and configurations. For example, when workloads share the same controller or disk volume, they also will share the same cache configuration. Unfortunately, this cache configuration often may not be beneficial to all of the workloads.

As another example, with existing approaches caching policies and configuration options can only be changed manually via a management interface. As a result, to adjust cache policies in response to changes in workloads manual intervention is required. Unfortunately, since manual intervention is impractical for frequent small-scale adjustments, resources for caching are typically overprovisioned leading to inefficient use of those resources.

SUMMARY

A method for dynamically allocating cache resources includes monitoring, by a storage controller computing apparatus, a hit or miss rate for each of a plurality of prior workloads and a performance of each of a plurality of cache storage resources. At least one configuration for the cache storage resources for one or more current workloads is determined, by the storage controller computing apparatus, based at least on a service level objective for each of the current workloads, the monitored hit or miss rate for each of the plurality of prior workloads, and the monitored performance of each of the plurality of cache storage resources. The cache storage resources are dynamically partitioned among each of the current workloads, by the storage controller computing apparatus, based on the determined configuration.

A storage management computing apparatus comprising at least one memory coupled to a processor configured to execute programmed instructions stored in the memory includes monitoring a hit or miss rate for each of a plurality of prior workloads and a performance of each of a plurality of cache storage resources. At least one configuration for the cache storage resources for one or more current workloads is determined based at least on a service level objective for each of the current workloads, the monitored hit or miss rate for each of the plurality of prior workloads, and the monitored performance of each of the plurality of cache storage resources. The cache storage resources are dynamically partitioned among each of the current workloads based on the determined configuration.

A non-transitory computer readable medium having stored thereon instructions for dynamically allocating cache resources comprising executable code which when executed by a processor, causes the processor to perform steps includes monitoring a hit or miss rate of a service level objective for each of a plurality of prior workloads and a performance of each of a plurality of cache storage resources. At least one configuration for the cache storage resources for one or more current workloads is determined based at least on a service level objective for each of the current workloads, the monitored hit or miss rate for each of the plurality of prior workloads, and the monitored performance of each of the plurality of cache storage resources. The cache storage resources are dynamically partitioned among each of the current workloads based on the determined configuration.

This technology provides a number of advantages including providing more effective methods, non-transitory computer readable medium and apparatuses for dynamically allocating cache storage resources to achieve externally specified service level objectives. With this technology, cache resources can be allocated to each workload as needed, rather than based on a static configuration simplifying cache management for administrators. Additionally, this technology is able to make a sensitivity based selection of a configuration for the cache resources that is less likely to produce large performance changes when there are small changes to workload behavior. Further, this technology is able to manage overload conditions through controlled downgrades in satisfaction of service level objectives for workloads.

DETAILED DESCRIPTION

Figure 1:
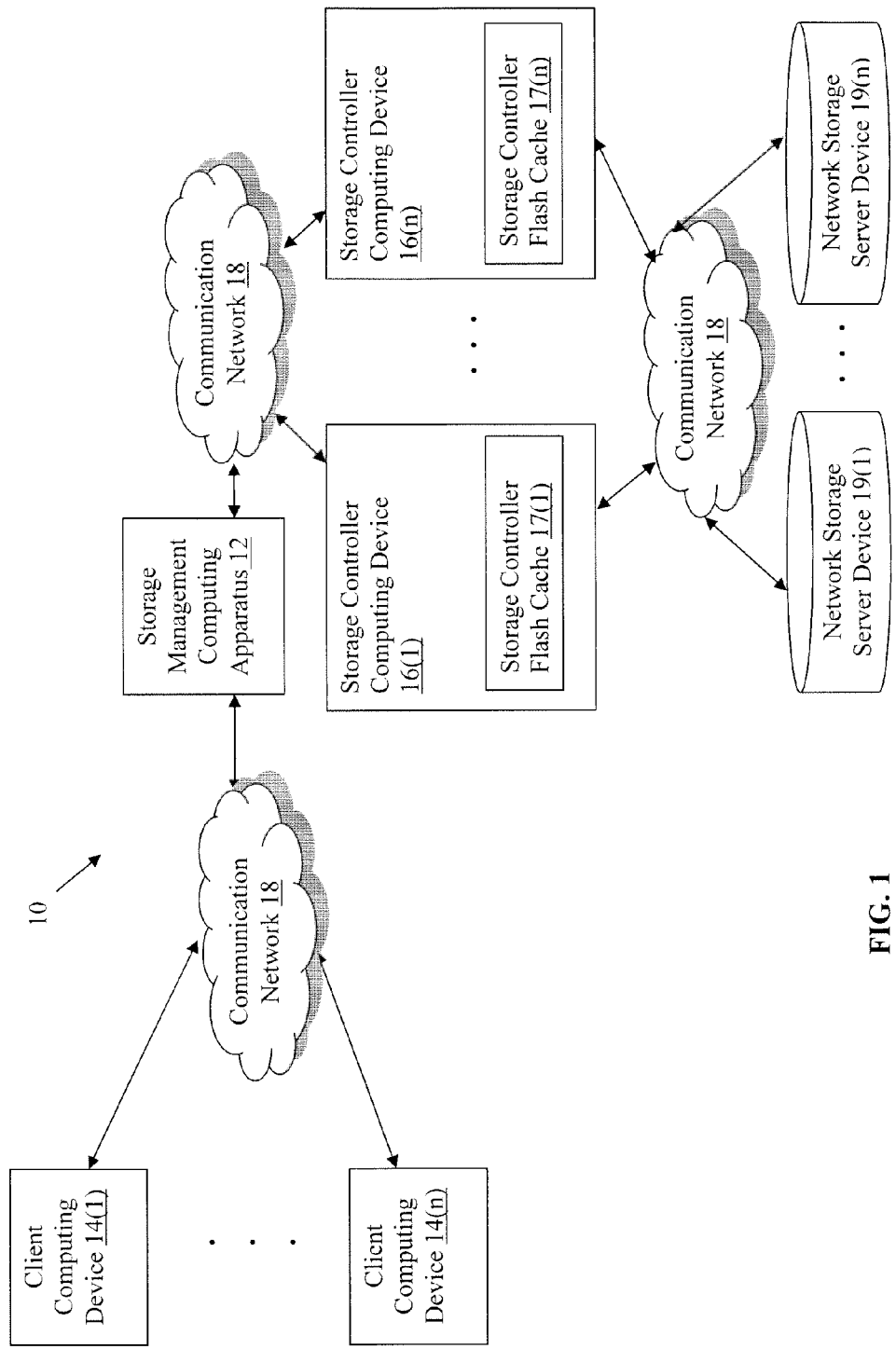
FIG. 1 is a block diagram of an environment with an example of a storage management computing apparatus that dynamically allocates cache resources.
Figure 2:
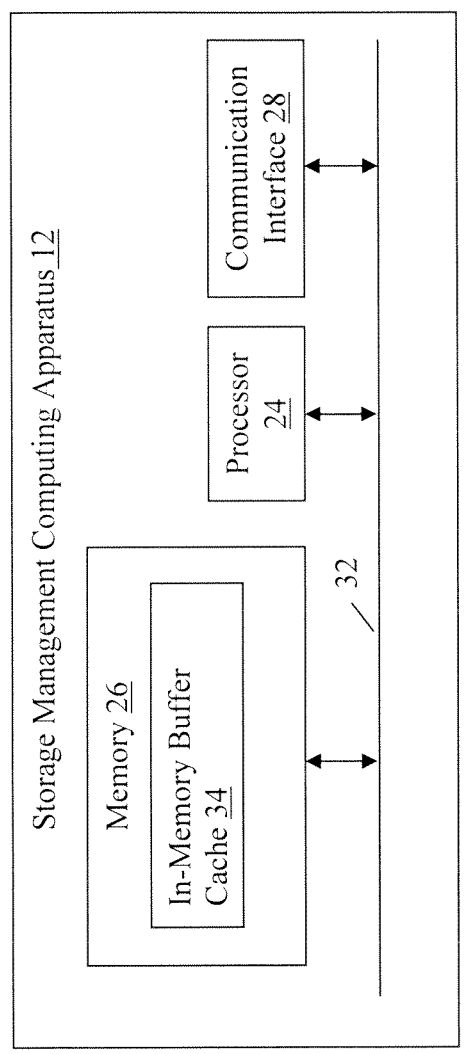
FIG. 2 is a block diagram of the example of the storage management computing apparatus shown in FIG. 1.

An environment 10 with an exemplary storage management computing apparatus 12 is illustrated in FIGS. 1-2. In this particular example, the environment 10 includes the storage management computing apparatus 12, client computing devices 14(1)-14(n), storage controller computing devices 16(1)-16(n), and network storage server devices 19(1)-19(n) coupled via one or more communication networks 18, although the environment could include other types and numbers of systems, devices, components, and/or other elements as is generally known in the art and will not be illustrated or described herein. This technology provides a number of advantages including providing methods, non-transitory computer readable medium, and apparatuses for dynamically allocating cache storage resources to achieve externally specified service level objectives, also referred to as performance targets.

Referring more specifically to FIGS. 1-2, in this example the storage management computing apparatus 12 is used to manage allocation of internal and/or external cache resources, such as in-memory buffer cache 34 and storage controller flash cache 17(1)-17(n) by way of example only, although other types and/or numbers of cache resources could be managed. The storage management computing apparatus 12 includes a processor 24, a memory 26 with an in-memory buffer cache 34, and a communication interface 28 which are coupled together by a bus 32, although the storage management computing apparatus 12 may include other types and numbers of systems, devices, components, and/or other elements in other configurations.

The processor 24 of the storage management computing apparatus 12 may execute one or more programmed instructions stored in the memory 26 for dynamically allocating cache resources as illustrated and described in the examples herein, although other types and numbers of functions and/or other operation can be performed. The processor 24 of the storage management computing apparatus 12 may include one or more central processing units and/or general purpose processors with one or more processing cores, for example.

The memory 26 of the storage management computing apparatus 12 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26. In this example, the memory 26 further includes an in-memory buffer cache 34, although the memory could have other types and/or numbers of cache resources.

The communication interface 28 of the storage management computing apparatus 12 operatively couples and communicates between the traffic management device 12, the client computing devices 14(1)-14(n), the storage controller computing devices 16(1)-16(n) with the storage controller flash cache 17(1)-17(n), and network storage server devices 19(1)-19(n), which are all coupled together by one or more of the communication networks 18, although other types and numbers of communication networks or systems with other types and numbers of connections and configurations to other devices and elements. By way of example only, the communication networks 18 can use TCP/IP over Ethernet and industry-standard protocols, including NFS, CIFS, SOAP, XML, LDAP, SCSI, and SNMP, although other types and numbers of communication networks, can be used. The communication networks 18 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the client computing devices 14(1)-14(n) may run applications that may provide an interface to make requests for and receive content, such as data blocks, web pages, applications, and/or other information hosted by one or more of the network storage server devices 19(1)-19(n) via the storage controller computing devices 16(1)-16(n) managed by storage management computing apparatus 12. Additionally, in this particular example, each of the storage controller computing devices 16(1)-16(n) represent physical machines used to manage operations with the network storage server devices 19(1)-19(n), although other configurations, such as a virtual network with virtual machines could be used by way of example only.

The network storage server devices 19(1)-19(n) may store and provide content or other network resources in response to requests from the client computing devices 14(1)-14(n) via one or more of the communication networks 18, for example, although other types and numbers of storage media in other configurations could be used. In particular, the network storage server devices 19(1)-19(n) may each comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the network storage server devices 19(1)-19(n) and transmitting data (e.g., files or web pages) in response to requests from the client computing devices 14(1)-14(n)

Each of the client computing devices 14(1)-14(n), each of the storage controller computing devices 16(1)-16(n), and each of the network storage server devices 19(1)-19(n) may include a processor, a memory, and a communication interface, which are coupled together by a bus or other link, although other numbers and types of devices and/or nodes as well as other network elements could be used. Additionally, in this example the memory in each of the storage controller computing devices 16(1)-16(n) may include a storage controller flash cache 17(1)-17(n), respectively, although the each of the storage controller computing devices 16(1)-16(n) may have other types and/or numbers of cache resources.

Although the exemplary network environment 10 with the traffic management device 12, the client computing devices 14(1)-14(n), the storage controller computing devices 16(1)-16(n), the network storage server devices 19(1)-19(n), and communication networks 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
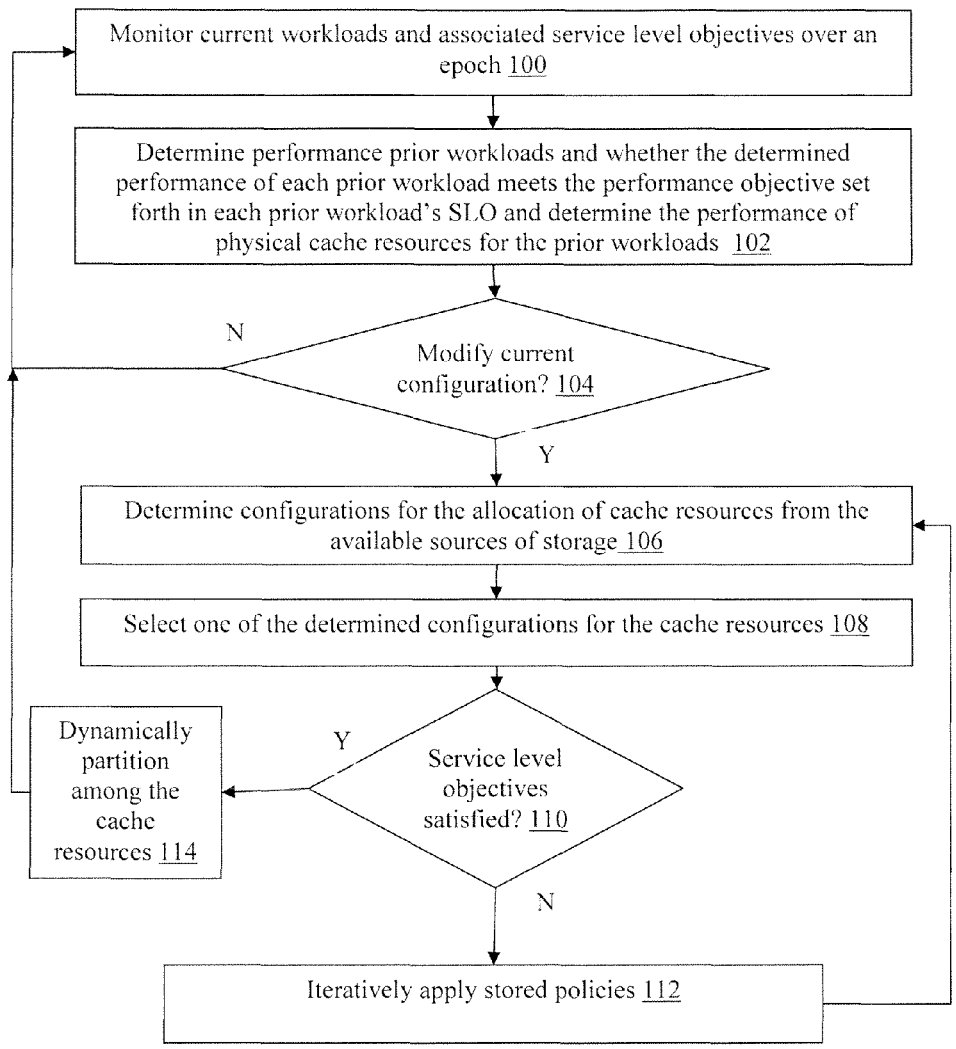
FIG. 3 is a flow chart of an example of a method for dynamically allocating cache resources.

An exemplary method for dynamically allocating cache resources will now be described with reference to FIGS. 1-4. Referring more specifically to FIG. 3, in this example in step 100, the storage management computing apparatus 12 monitors performance of a current configuration for cache resources for current workloads each with an associated service level objective over a period of time or epoch, although other types and/or numbers of parameters could be monitored. A service level objective (SLO) specifies a performance target for a workload and the workload's priority relative to other workloads in the system, although other types and/or numbers of metrics could be used.

Figure 4:
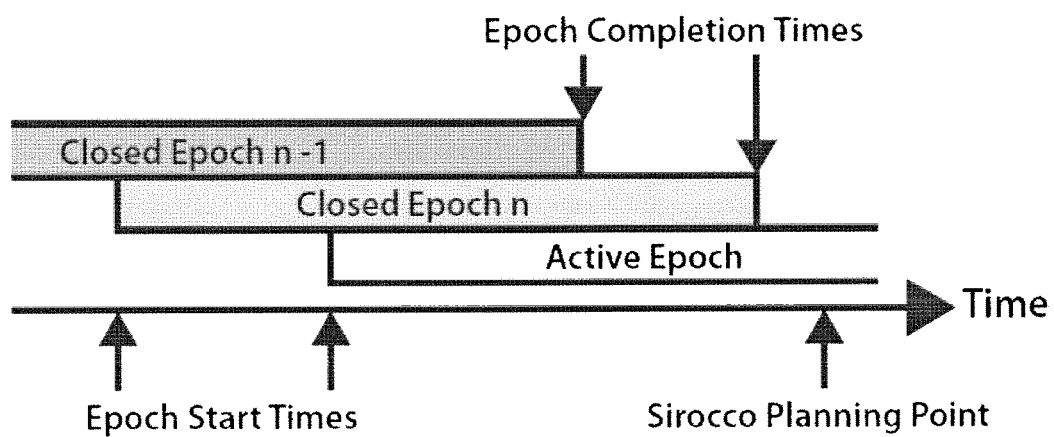
FIG. 4 is diagram of an example of a timeline for epochs.

An example of a time line for epochs is illustrated in FIG. 4. In this particular example, epochs are configured to overlap in time, although other configurations could be used. During an Active Epoch the storage management computing apparatus 12 is monitoring and gathering data, such as performance of a current configuration for cache resources for current workloads each with an associated service level objective by way of example, but this Active Epoch is not yet ready for use.

In step 102, the storage management computing apparatus 12 determines the performance of the prior workloads and whether the determined performance of each prior workload meets a performance objective set forth in each prior workload's SLO. Additionally, the storage management computing apparatus 12 determines the performance of the physical cache resources, such as one or more of the in-memory buffer cache 34 and/or the storage controller flash cache 17(1)-17(n) by way of example only. The time period or epoch used by the storage management computing apparatus 12 for these determinations is the last closed Epoch n, although other time periods or epochs could be used. In this example, the Epoch n-1 is considered to be out of date and will be discarded by the storage management computing apparatus 12.

In this example, the storage management computing apparatus 12 uses latency as the metric for determining the performance of each of the service level objectives of the prior workloads over the last Closed Epoch n, although other types and/or numbers of metrics could be used for determining the performance of each of these service level objectives of the prior workloads. Each prior workload has an assigned average I/O latency target as part of its service level objective, although the service level objective can use other types and/or numbers of parameters. Accordingly, in this example the storage management computing apparatus 12 determines performance of each service level objective based on results of a comparison of the monitored latency for each service level objective for each prior workload against the corresponding assigned average I/O latency target which show no violation of any of the service level objectives, although other performance metrics could be used.

In this example, the storage management computing apparatus 12 also uses latency as the metric for determining the performance of the physical cache resources, although other types and/or numbers of metrics could be used for determining the performance of the physical cache resources. In this particular example, the storage management computing apparatus 12 has a stored numeric constant as an average latency estimate for each type of cache resource. The storage management computing apparatus 12 also determines an average latency number based on the average performance of requests that hit at each level in the hierarchy of the cache resources and based on the average performance of requests that miss in at all levels in the hierarchy of the cache resources and have to be serviced by the underlying storage. In this example the storage management computing apparatus 12 determines performance of the physical cache resources, such as in-memory buffer cache 34 and/or the storage controller flash cache 17(1)-17(n) by way of example only.

In step 104, the storage management computing apparatus 12 determines whether the current configuration of the cache resources needs to be modified based on whether the determined performance of the prior workloads meets a performance objective set forth in an SLO for each of the prior workloads. In this example, the determined performance meets the performance objective if it is within a stored percentage, although other approaches could be used. By way of example only, if a performance objective or SLO is set at 5 ms and the stored percentage is set at +/−5%, then a determined performance between 4.75 ms and 5.25 ms would meet or satisfy the performance objective or SLO, although other types and/or numbers of parameters and other percentages or ranges for determining if there is acceptable performance or if there is underperformance or over performance could be used.

Accordingly, if in step 104 the storage management computing apparatus 12 determines the current configuration of the cache resources does not need to be modified, then the No branch is taken back to step 100 for continued monitoring. If the storage management computing apparatus 12 determines the current configuration of the cache resources does need to be modified, then the Yes branch is taken to step 106.

In step 106, the storage management computing apparatus 12 determines one or more new configurations or solutions for the allocation of cache resources from the available sources of storage for the current workloads that provide satisfactory performance of the service level objectives of the prior workload. In this example, to correct an unsatisfactory performance of the service level objectives of the prior workloads the storage management computing apparatus 12 may use a stored cache model to adjust a size of one or more cache resources. Additionally, to correct an unsatisfactory performance of the cache resources, the storage management computing apparatus 12 may use stored statistics on the observed hit or miss ratios for differing sizes of the cache resources to adjust a size of one or more cache resources. When determining the one or more configurations, the storage management computing apparatus 12 may consider multiple types and/or numbers of cache resources each with different performance characteristics and may determine a plurality of new configurations that should meet the service level objective of each current workload. Further, when determining the one or more new configurations or solutions for the allocation of cache resources, the storage management computing apparatus 12 may also take into account the monitored performance of the physical cache resources, although other types and/or numbers of other parameters or other factors could be used when making this determination.

By way of example only, to determine viable configurations, the storage management computing apparatus 12 starts out by considering one workload at a time. In this example for each workload, the storage management computing apparatus 12 produces an estimated cache size vs. cache hit rate curve based on the monitored sampling data gathered back in step 100. Once the storage management computing apparatus 12 has determined the estimated cache performance curve, the storage management computing apparatus 12 computes a set of possible cache solutions for the current workload, using a pre-configured stored numeric model for the latency characteristics of each storage type. Note that in this example the solution computed by the storage management computing apparatus 12 for each workload is based on the currently available set of cache resources, which means that the first workload evaluated can choose solutions using all of the cache resources, but the second workload will only be able to consider cache resources left over after the first workload has selected its optimal solution candidate. If the storage management computing apparatus 12 succeeds in finding a viable optimal configuration for every workload, the storage management computing apparatus 12 will accept the solutions as a viable configuration.

In step 108, the storage management computing apparatus 12 selects one of the determined configurations for the cache resources based on one or more factors. In this particular example, the storage management computing apparatus 12 determines a quantitative cost or value to each of the determined configurations for the cache resources based on a configurable cost metric. Accordingly, once a cost has been assigned to each configuration, the storage management computing apparatus 12 may select the one of the determined configurations with the lowest cost, although other types and/or numbers of factors, alone or in combination, may also be used in determining the selection.

By way of example only, a cost function that may be used by the storage management computing apparatus 12 to determine the quantitative cost or value might be one that adds up the total size of all cache resources used in the determined configuration. The determined configuration that consumes the fewest total resources would then be the lowest cost option.

Another cost function that may be used by the storage management computing apparatus 12 to determine the quantitative cost or value might be one that uses the dollar-cost of the hardware for the cache resources. The storage management computing apparatus 12 may have or obtain a stored record of the costs assigned to each discreet cache resource and uses those costs to assess the value of the portion of each cache resource consumed in each determined configuration. This cost metric minimizes dollar-cost of cache resources used.

Yet another cost function that may be used by the storage management computing apparatus 12 to determine the quantitative cost or value might be one that uses a cache warming time cost function. The goal of this cache warming time cost function is to favor the one of the determined configurations that will most quickly return a workload to satisfying its service level objective. The storage management computing apparatus 12 evaluates the length of time to warm the cache resources allocated to a workload and assigns a cost based on a latency penalty paid while warming those cache resources. In this example, the cache warming time cost function assumes data already stored in cache resources will be carried over from one determined configuration to another determined configuration, provided the new determined configuration has enough space in the reallocated cache resources to hold the data. The cache warming time cost function also assumes that newly allocated faster cache resources can be warmed using data already stored in slower cache resources from the prior configuration. Thus, when migrating from configuration or solution N−1 to configuration or solution N, the cost of increasing the size of a single cache tier can be expressed as follows:

$$Cost_{warming} = Latency_{miss} * (Size_{solnN} - Size_{solnN-1})$$

In this equation, $Cost_{warming}$ is the quantitative cost assigned to a solution based on this metric. $Latency_{miss}$ is the modeled latency of a cache miss in milliseconds. $Size_{solnN}$ is the size of the cache resources included in the new proposed configuration. $Size_{solnN-1}$ is the size of the existing cache resources in the old configuration.

The cost of shrinking a cache resource is always zero. When reconfiguring multiple cache resources simultaneously, the warming penalty always assumes that data will be read from the fastest available copy. If a newly allocated large cache resource can be partially warmed using the contents of a faster, small, pre-existing cache resource, then the newly allocated large cache resource will take as much data as possible from that smaller cache resource and fault the rest in from the primary storage. In such a case, $$Cost_{warming} = Latency_{fast} * Size_{fast} + Latency_{miss} * (Size_{slow} - Size_{fast})$$

In this equation, $Cost_{warming}$ is the quantitative cost assigned to a solution based on this metric. $Latency_{miss}$ is the modeled latency of a cache miss in milliseconds. $Size_{solnN}$ is the size of the cache resources included in the new, proposed configuration. $Size_{solnN-1}$ is the size of the existing cache resources in the old configuration.

Yet another cost function that may be used by the storage management computing apparatus 12 to determine the quantitative cost or value is an error sensitivity function or sensitivity function. The storage management computing apparatus 12 may test the sensitivity of each of the determined configurations to any changes in workloads and then select the determined configuration with the least sensitivity to change, although again other types and/or numbers of factors, alone or in combination, may also be used in determining the selection.

As one example, the storage management computing apparatus 12 may determine a curve predicting hit/miss rate as a function of size of the cache resources. Because that curve is only estimation and not a perfect model of future workload behavior, the actual result produced by a particular determined configuration or solution is likely to vary. As a result, the storage management computing apparatus 12 may use a sensitivity function that favors sizes of the cache resources in a determined configuration that fall on relatively flat portions of the predicted hit/miss curve. As a result, if the true amount of cache resources needed to produce the desired hit rate for a workload is slightly higher than the amount allocated by the determined configuration, then the error will produce a relatively modest reduction in observed workload performance. If the size of the cache resources were selected at a point of steeper slope on the determined curve by the storage management computing apparatus 12, a small variation would be expected to produce a much larger change in observed performance and a much larger impact on the target workload.

To quantify the cost associated with the sensitivity function, the storage management computing apparatus 12 first computes the slope of the hit/miss curve at the point selected. Based on that local slope, storage management computing apparatus 12 computes a hypothetical performance model that assumes that the actual hit rate for the workload is slightly off from the prediction. In this particular example, that margin of error that the workload is slightly off by is ten percent, although other percentages could be used.

The storage management computing apparatus 12 uses the sensitivity function to compute a pessimistic hit rate prediction by extrapolating along the slope of the curve and to compute a pessimistic latency prediction using that hit rate and the expected latency model for that cache. The cost assigned to each determined configuration by the storage management computing apparatus 12 is the delta between the pessimistic latency prediction for a size of the cache resources and the normal latency prediction. Thus, the cost assigned by the sensitivity function is computed by the storage management computing apparatus 12 as:

$$Cost_{sensitivity} = (Latency_{hit} * HitRate_{Pessimistic} + Latency_{miss} * (1 - HitRate_{Pessimistic})) - (Latency_{hit} * HitRate_{Predicted} + Latency_{miss} * (1 - HitRate_{Predicted}))$$

In this equation, $Cost_{sensitivity}$ is the total quantitative cost assigned by this metric. $Latency_{hit}$ is the millisecond latency of a hit in the cache under evaluation. $Latency_{miss}$ is the latency of a miss in the cache, which must then be satisfied from the slower backing storage. $HitRate_{Pessimistic}$ is the fraction of requests expected to produce a hit in the proposed cache size, based on the pessimistic model of cache performance. $HitRate_{Predicted}$ is the fraction of requests expected to produce a hit in the proposed cache based on the primary model of cache performance.

In step 110, the storage management computing apparatus 12 determines whether the performance of the service level objectives for each of the current workloads for the selected configuration is satisfactory. For example, if all of the service level objectives for each of the current workloads would be met by the selected one of the determined configuration, then the storage management computing apparatus 12 may determine the performance to be satisfactory. In another example, if all of the service level objectives for each of the current workloads would not be met by the selected one of the determined configuration, but the deviations are within the implementation of a stored policy as described in greater detail below, then the storage management computing apparatus 12 may also determine the performance to be satisfactory. If the storage management computing apparatus 12 determines the predicted performance of the service level objectives for each of the current workloads for the selected configuration is not satisfactory, then the No branch is taken to step 112.

In step 112, the storage management computing apparatus 12, begins to iteratively apply one of a plurality of stored policies to adjust the determined configuration, although other manners for determining the order in which the stored polices are applied can be used. By way of example, one of the stored policies may further adjust the configuration of the cache resources. As another example, one of the stored policies may implement a new set of degraded service level objectives for each current workload, such as degrading all service level objectives by the same fixed percentage. In another example, one of the stored policies may decrease the service level objectives of workloads with a priority setting below a threshold, i.e. low priority workloads, to provide performance consistency for the workloads with a priority setting at or above a threshold, i.e. high priority workloads. In yet another example, one of the stored policies may be a pack policy which tries to optimize the number of workloads that fit into available cache resources by searching through the solution space for every workload to try to find a combination that will fit.

More complex policies may also be implemented by storage management computing apparatus 12. By way of example only, in response to an overload, a stored policy be implemented by storage management computing apparatus 12 might initially degrade the service level objective of workloads with a priority setting below a threshold, i.e. low priority workloads, but if the overloaded persists for longer than a stored period of time or other marker, would shift to evenly degrade the service level objectives of all workloads. With this policy high priority workloads would be insulated from temporary load spikes, but low workloads would not face starvation in the presence of long-term system overload. The policies described herein are only examples and other types and numbers of policies may be used by the storage controller computing.

Accordingly, in step 112 the storage management computing apparatus 12 iteratively selects the next one of the plurality of stored policies to apply and then returns to step 106. In step 106 the storage management computing apparatus 12 executes the selected one of the plurality of stored policies and then determines configurations for the allocation of cache resources from the available sources of storage taking into account the impact of the execution of the selected one of the plurality of stored policies on the determined configurations. Steps 108 and 110 are then implemented in the same manners as described before.

If back in step 110 the storage management computing apparatus 12 determines the predicted performance of the service level objectives for each of the current workloads for the selected configuration is satisfactory, then the Yes branch is taken to step 114. In step 114, the storage management computing apparatus 12 dynamically partitions the cache resources based on the determined configuration to achieve externally specified service level objectives for the current workloads.

A few examples of experiments illustrating the operation of this technology will now be described in greater detail below. These examples show this technology correctly changes the size of the cache resources for a workload based on changes in the workloads behavior. Additionally, these experiments illustrate and describe the operation of examples of cost functions and global policies which may be used by the storage management computing apparatus 12. In these particular examples, a hardware configuration was simulated with DRAM (1 μs latency) and flash (1 ms latency) tiers for caching, and a disk tier (10 ms latency) that handles cache misses. Each workload interval contains 100,000 requests.

The first experiments relate to size validation. In these experiments, two different techniques are used to estimate and measure performance. First, a full simulator is used to determine the hit rates at the chosen sizes of the cache resources for a workload. Second, an estimator is used to predict the hit rates that would be seen at other sizes for the cache resources. The first part of this validation is provided to show that the results returned by the estimator with this technology can be used to choose sizes for the cache resources that meet service level objectives of the workloads.

In this experiment, performance on a single workload that includes several of the types of behavior was used. For this workload, a random load generator was used, varying the skew in the workload over time. The workload goes through three different phases (1) Constant: This phase uses a constant workload with a large working set size. The goal is to demonstrate that this technology quickly converges on a cache configuration that meets the SLO; (2) Slow Changes: In this phase the working set size slowly decrease and then increases back to the size used in the first phase. The goal is to show that this technology changes the cache configuration to continue meeting the SLO in response to workload changes; and (3) Large Changes: In this phase the workload periodically switches between a large and small working set size. The goal is to show that this technology is also effective with sudden and large changes in workload behavior.

Figure 5:
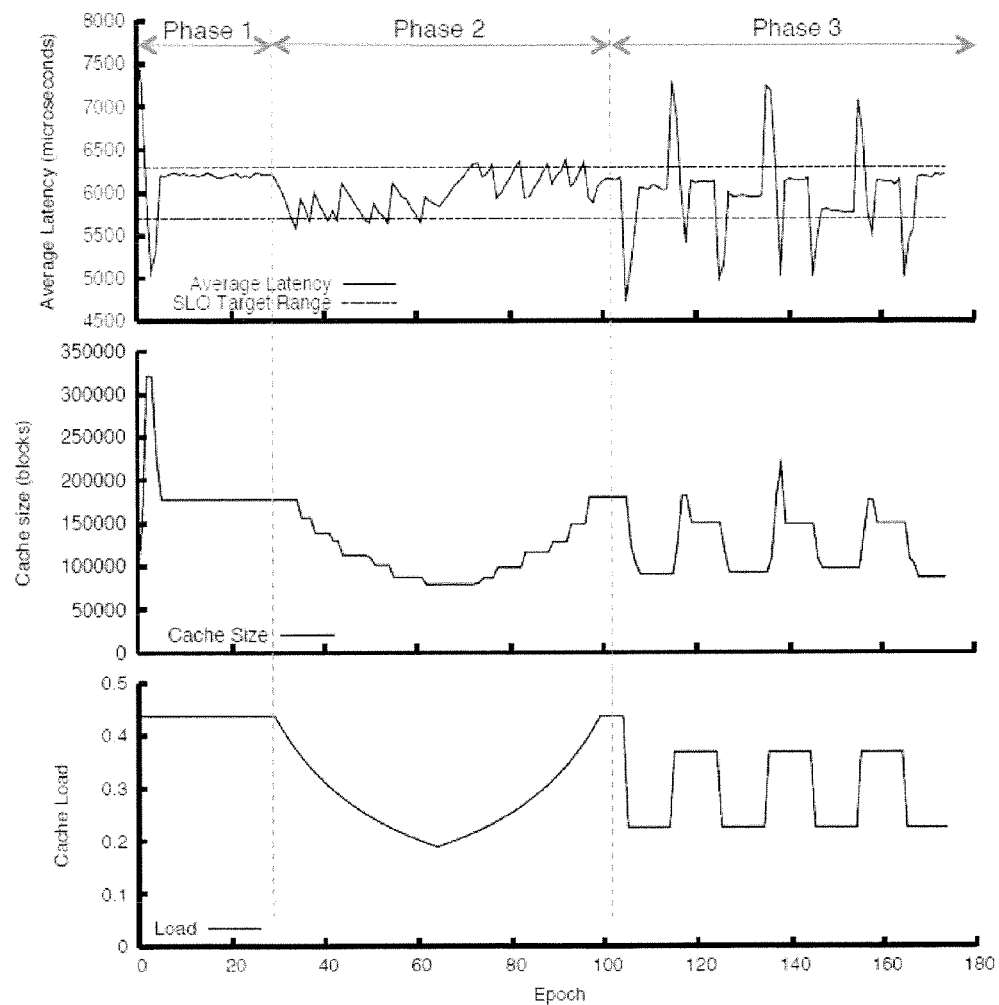
FIG. 5 is a graph of an example of results of a validation test.

In this experiment, the total data size of the workload is one million blocks. A flash cache that also has one million blocks is used, so the technology will never run out of flash. The performance target of the service level objective is an average latency of 6 ms. In this particular experiment, this technology considers performance within 5% of this target to be acceptable. The results of this test are shown in FIG. 5.

In the first phase, this technology in this experiment quickly zeros in on a cache size of 194,000 blocks, which provides the desired performance. This technology in this experiment does not immediately select this size because it takes a few intervals before the sizer has seen enough requests to have a good model of the workload.

In the second phase, a pattern repeatedly plays out. This technology in this experiment starts with a size for the cache resources that meet the target set for the service level objective. This technology in this experiment keeps this size as the load slowly changes. The latency shows a corresponding increase or decrease (depending on whether the working set is growing or shrinking, respectively). Eventually the performance moves outside the target range of 5.7-6.3 ms. At this point, this technology in this experiment resizes the cache resources to move performance back to the performance target for the service level objective. Then the process repeats itself. The result is a step-like pattern of sizes for the cache resources and a saw-tooth pattern of performance. Each time this technology in this experiment resizes the cache resources, a size that will bring it as close as possible to the target latency of 6 ms is selected.

In the third phase, this technology in this experiment exhibits a different repeated behavior. With each large change in working set size, performance shows a sharp spike away from the performance target for the service level objective. This is expected, since this technology does not change the configuration for the cache resources until this technology sees a violation of a service level objective. These spikes are the violation in this experiment. The size of the violations is much larger than in the second test phase because the change in working set size is much larger. When increasing the size of the cache resources, this technology in this experiment selects new sizes of the cache resources that are too large, resulting in over performance as more data is cached than is needed to meet the performance target for the service level objective. In this case the error correction mechanism in this particular experiment is the culprit. This error correction simply responds to differences between predicted and measured performance.

Referring to FIG. 5, this graph presents the results of the validation test for the size validation experiment described above. The bottom graph shows the offered load over time. Load is measured as the fraction of the workload that must be cached to achieve a 90% hit rate. The middle graph shows the cache sizes selected by this technology. The top graph shows the resulting performance. The region of the performance graph delimited by horizontal dashed lines indicates the acceptable performance range: 6±0.3 ms. The vertical dashed lines divide the graphs to indicate the three phases of the test: Constant; Slow Changes; and Large Changes.

The second experiments relate to use of different cost functions. Examples of this technology using two different cost functions to select one of the determined configurations for the cache resources is illustrated with reference to FIG. 7. The bottom graph shows the cache demand from two competing workloads, measured as the fraction of the workload that must be cached to achieve a 90% hit rate. The middle graph compares the performance of Load 1 with the Sensitivity and cost of goods (COGS) cost functions. The top graph compares the performance of Load 2 with the same two cost functions. In most of these second experiments the choice of cost function had little impact on the accuracy of the performance of this technology. In a several cases, however there was a marked benefit from using the sensitivity cost function. One such experiment is discussed below.

Figure 7:
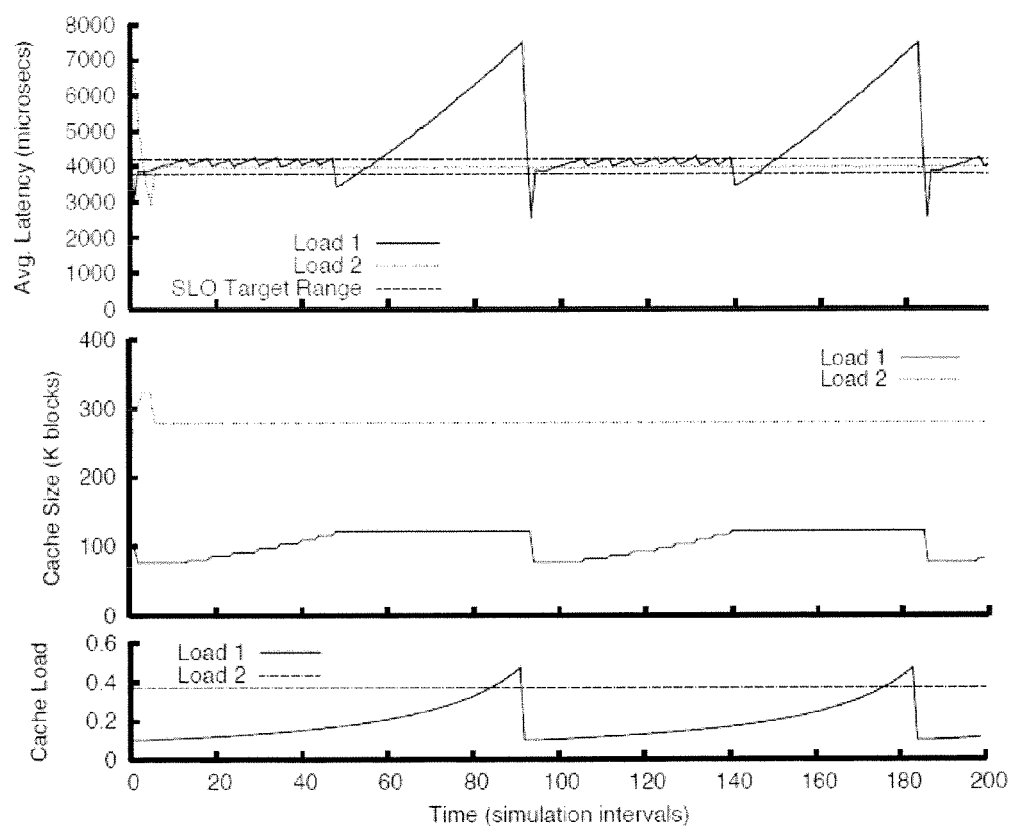
FIG. 7 is a graph of an example of competing workloads without an implemented global policy.

In this experiment, a pair of competing workloads (Load 1 and Load 2) were run, as shown in the bottom graph in FIG. 7. Load 1 was a periodic workload that increases demand for the cache resources in a step-like manner and then makes a sharp drop back to its original load level. Load 2 was a constant workload. Each workload had a total data set of one million blocks. In this experiment, two cache resources were simulated, one with SSD performance (1 ms access latency) and one with memory performance (1 μs access latency). The cost of the memory cache was ten times higher than the cost of the SSD cache. Both workloads had a performance target of 0.72-0.88 ms for their service level objective. Because the performance target fell between the access latencies of the two caches, this technology in this experiment needed to use cache resources from both layers to reach the performance target for the service level objective. Also, because this was a narrow target window, there was little margin for error in selecting the cache sizes.

Figure 6:
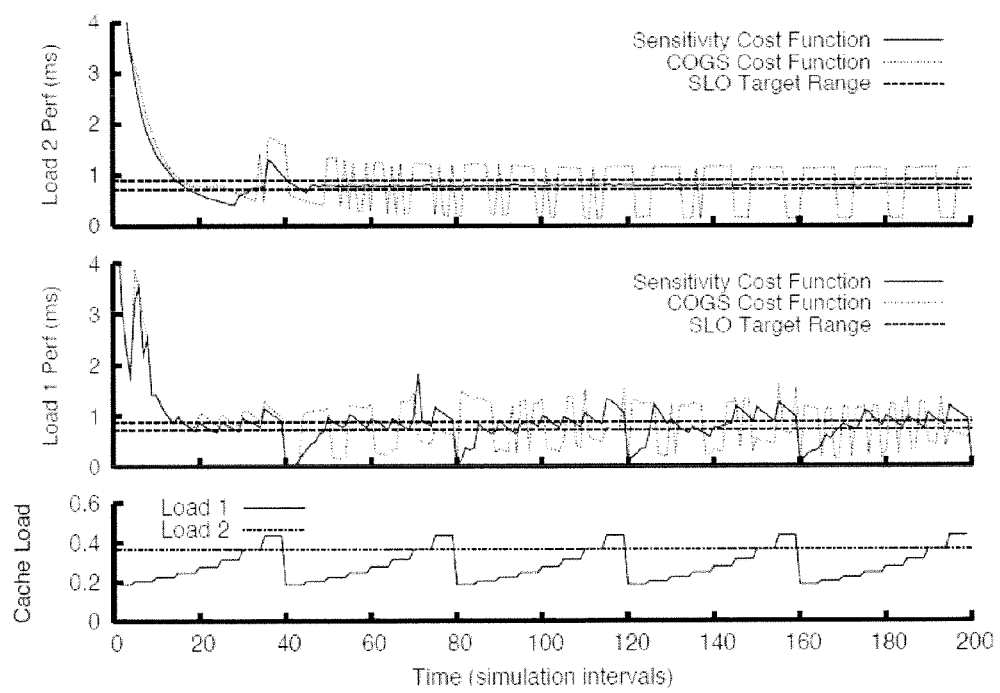
FIG. 6 is a graph of an example of a cost function comparison.

In this experiment, the sensitivity cost function was compared against the cost of goods (COGS) cost function. The performance results are shown in the top graph in FIG. 6. A marked difference in the behavior of the two cost functions was demonstrated. For Load 1, this technology in this experiment using the sensitivity cost function was usually able to keep performance in or near the performance target, except at the large load change at the end of each cycle in the workload. In contrast, this technology in this experiment using the cost of goods (COGS) cost function bounced back and forth either over-performing or underperformance and seldom coming close to the performance target.

This contrast is even more pronounced with Load 2, the flat workload. With the sensitivity cost function, this technology in this experiment was able to zero in on a cache configuration that meets the performance target. With the cost of goods (COGS) cost function, this technology in this experiment was never able to achieve this and performance continues oscillating around the target.

The last experiments relate to implementation of one or more stored policies also referred to as global policies. These stored policies allow a system designer to define the behavior of this technology when there is an overload. A stored policy simply defines how this technology should adjust the service level objectives for one or more workloads when there are not enough cache resources to satisfy all of the service level objectives of the workloads.

To demonstrate the impact, examples of experiments with this technology operating with and without a global policy are discussed below. In these experiments, a pair of competing workloads were run: Load 1 which was a periodic workload that slowly increases demand for the cache and then drops back to its original load level; and Load 2 which was a constant workload. Both workloads have a performance target for the service level objective in this example of 4 ms average latency. In these experiments, the two workloads were run with 400,000 cache blocks enough to easily meet the performance target of the service level objectives when Load 1 has low cache demand and substantially less than would be needed to meet the performance target of the service level objectives when Load 1 is at its peak.

Figure 8:
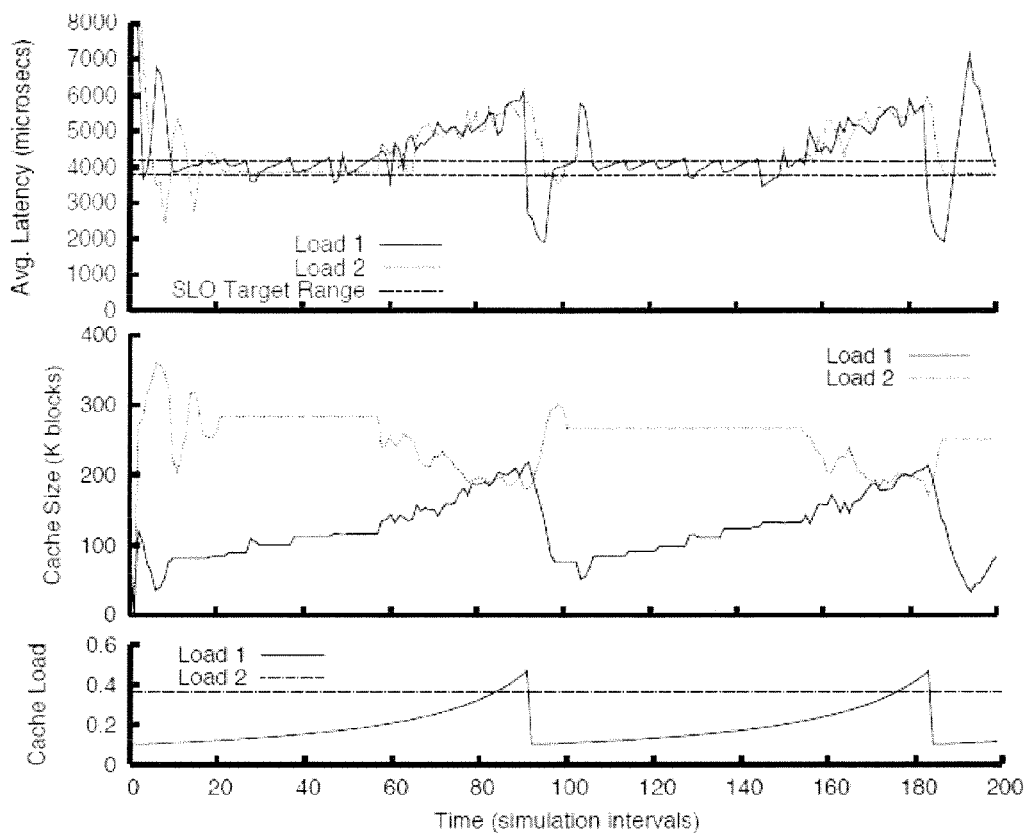
FIG. 8 is a graph of an example of competing workloads with an implemented global policy.

Referring to FIG. 8, this technology in this first experiment does not use a global policy. As a result, if there are not enough cache resources for a workload to meet the performance target of the service level objective, the workload must make do with what is available. The results demonstrate this effect. When Load 1 has a low cache demand, there are enough cache resources. At this point, this technology in this experiment finds a cache configuration for Load 2 that will meet the performance target of the service level objectives and acquires those cache resources. As Load 1 increases, this technology in this experiment uses more and more of the remaining cache resources until they runs out. At this point the performance of Load 1 degrades rapidly. Because Load 2 already has sufficient cache resources, its performance is unaffected.

In the second experiment, this technology does use a global policy which decreases the service level objective of all workloads until there are enough cache resources to meet these degraded performance targets. FIG. 8 shows the results of this second test. At the beginning, the behavior is similar. Load 2 finds a cache configuration that meets the performance target for its service level objective and Load 1 allocates more and more cache space to maintain the performance target for its service level objective in the face of increased load. When this technology in this experiment runs out of space in the available cache resources (near simulation interval 50), the behavior is different. Both workloads suffer similar performance penalties, and these penalties are less than the total penalty suffered by Load 1 in the first scenario. The explanation can be seen in the allocation of cache space. When this technology in this experiment runs out of cache resources, the cache resources allocated to Load 2 decreases and the cache resources are allocated to Load 1. As a result, the performance degradation is shared across the workloads.

Accordingly, as described and illustrated by way of the description and examples herein, this technology provides methods, non-transitory computer readable medium and apparatuses for dynamically allocating cache storage resources to achieve externally specified service level objectives. With this technology, cache resources can be allocated to each workload as needed, rather than having workloads compete with each other for larger shared resources. This technology also allows cache resources to be reconfigured on-the-fly, rather than requiring administrator intervention. Additionally, this technology provides a mechanism for maintaining performance of service level objectives in an active storage system. Further, when confronted with a set of workloads with service level objectives that cannot be supported, this technology is able apply a global policy to decide how to apportion cache resources in a predictable way.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
monitoring, by a computing device, a performance rate for each of a plurality of prior workloads and a latency of each of a plurality of cache storage resources;
determining, by the computing device, a plurality of configurations for the plurality of cache storage resources for one or more current workloads based at least on a service level objective for each of the one or more current workloads, the monitored performance rate for each of the plurality of prior workloads, and the monitored latency of each of the plurality of cache storage resources;
determining, by the computing device, a cost for each of the determined plurality of configurations;
selecting, by the computing device, one of the determined plurality of configurations for the dynamic partitioning based on the determined cost for each of the determined plurality of configurations; and
dynamically partitioning, by the computing device, the plurality of cache storage resources among each of the one or more current workloads based on the selected one of the determined plurality of configurations.

2. The method as set forth in claim 1 wherein the plurality of cache storage resources comprises an in-memory buffer cache and a flash cache.

3. The method as set forth in claim 1 further comprising modeling, by the computing device, the observed performance rate for each of the plurality of prior workloads over a range of sizes of the plurality of cache storage resources, wherein determining the configuration for the plurality of cache storage resources for the one or more current workloads is further based on the modeling.

4. The method as set forth in claim 1 further comprising:
identifying, by the computing device, when the service level objective for at least one of the one or more current workloads is not met by the determined configuration for the plurality of cache storage resources; and
modifying, by the computing device, the determined configuration for the plurality of cache storage resources when the service level objective for at least one of the one or more current workloads is not met.

5. The method as set forth in claim 1 wherein determining the total cost for each of the determined plurality of configurations comprises:
obtaining, by the computing apparatus, a cache resource cost assigned to each of the plurality of cache storage resources; and
determining, by the computing apparatus, a value of a portion of each of the plurality of cache storage resources consumed in each of the determined plurality of configurations based on the obtained cache resource cost assigned to each of the plurality of cache storage resources, wherein the determined total cost for each of the determined plurality of configurations is a sum of the determined values that configuration.

6. The method as set forth in claim 1 wherein determining the total cost for each of the determined plurality of configurations comprises determining an error sensitivity cost for each of the determined plurality of configurations, and wherein selecting one of the determined plurality of configurations for the dynamic partitioning comprises selecting one of the determined plurality of configurations that has a lowest error sensitivity cost for dynamic partitioning.

7. A computing device comprising:
a memory containing a machine readable medium comprising machine executable code having stored thereon instructions for performing a method of dynamically allocating cache storage resources; and
a processor coupled to the memory, the processor configured to execute the machine executable code to cause the processor to:
monitor a performance rate for each of a plurality of prior workloads and a latency of each of a plurality of cache storage resources over consecutive and partially overlapping period of times;
determine a plurality of configurations for the plurality of cache storage resources for one or more current workloads based at least on a service level objective for each of the one or more current workloads, the monitored performance rate for each of the plurality of prior workloads, and the monitored latency of each of the plurality of cache storage resources;
determine a cost for each of the determined plurality of configurations;
select one of the determined plurality of configurations for the dynamic partitioning based on the determined cost for each of the determined plurality of configurations; and
dynamically partition the plurality of cache storage resources among each of the one or more current workloads based on the selected one of the determined plurality of configurations.

8. The device as set forth in claim 7 wherein the plurality of cache storage resources comprises an in-memory buffer cache and a flash cache.

9. The device as set forth in claim 7 wherein the machine executable code further causes the processor to model the performance rate for each of the plurality of prior workloads over a range of sizes of the plurality of cache storage resources, and wherein determining the configuration for the plurality of cache storage resources for the one or more current workloads is further based on the modeling.

10. The device as set forth in claim 7 wherein the machine executable code further causes the processor to:
identify when the service level objective for at least one of the one or more current workloads is not met by the determined configuration for the plurality of cache storage resources; and
modify the determined configuration for the plurality of cache storage resources when the service level objective for at least one of the one or more current workloads is not met.

11. The device as set forth in claim 7 wherein determining the total cost for each of the determined plurality of configurations comprises:
obtaining a cache resource cost assigned to each of the plurality of cache storage resources; and
determining a value of a portion of each of the plurality of cache storage resources consumed in each of the determined plurality of configurations based on the obtained cache resource cost assigned to each of the plurality of cache storage resources, wherein the determined total cost for each of the determined plurality of configurations is a sum of the determined values that configuration.

12. The device as set forth in claim 7 wherein determining the total cost for each of the determined plurality of configurations comprises determining an error sensitivity cost for each of the determined plurality of configurations and wherein selecting one of the determined plurality of configurations for the dynamic partitioning comprises selecting one of the determined plurality of configurations that has a lowest error sensitivity cost for the dynamic partitioning.

13. A non-transitory machine readable medium having stored thereon instructions for performing a method comprising machine executable code which, when executed by at least one machine, causes the at least one machine to:
monitor a performance rate for each of a plurality of prior workloads and a latency of each of a plurality of cache storage resources;
determine a plurality of configurations for the plurality of cache storage resources for one or more current workloads based at least on a service level objective for each of the one or more current workloads, the monitored performance rate for each of the plurality of prior workloads, and the monitored latency of each of the plurality of cache storage resources;
determine a cost for each of the determined plurality of configurations;
select one of the determined plurality of configurations for the dynamic partitioning based on the determined cost for each of the determined plurality of configurations; and
dynamically partition the plurality of cache storage resources among each of the one or more current workloads based on the selected one of the determined plurality of configurations.

14. The medium as set forth in claim 13 wherein the plurality of cache storage resources comprises an in-memory buffer cache and a flash cache.

15. The medium as set forth in claim 13 wherein the machine executable code further causes the machine to model the performance rate for each of the plurality of prior workloads over a range of sizes of the plurality of cache storage resources, wherein determining the configuration for the plurality of cache storage resources for the one or more current workloads is further based on the modeling.

16. The medium as set forth in claim 13 wherein the machine executable code further causes the machine to:
identify when the service level objective for at least one of the one or more current workloads is not met by the determined configuration for the plurality of cache storage resources; and
modify the determined configuration for the plurality of cache storage resources when the service level objective for at least one of the one or more current workloads is not met.

17. The medium as set forth in claim 13 wherein determining the total cost for each of the determined plurality of configurations comprises:
obtaining a cache resource cost assigned to each of the plurality of cache storage resources; and
determining a value of a portion of each of the plurality of cache storage resources consumed in each of the determined plurality of configurations based on the obtained cache resource cost assigned to each of the plurality of cache storage resources, wherein the determined total cost for each of the determined plurality of configurations is a sum of the determined values for that configuration.

18. The medium as set forth in claim 13 wherein determining the total cost for each of the determined plurality of configurations comprises determining an error sensitivity cost for each of the determined plurality of configurations, and wherein selecting one of the determined plurality of configurations for the dynamic partitioning comprises selecting one of the determined plurality of configurations that has a lowest error sensitivity cost for the dynamic partitioning.

\* \* \* \* \*